UNITED STATES PATENT OFFICE.

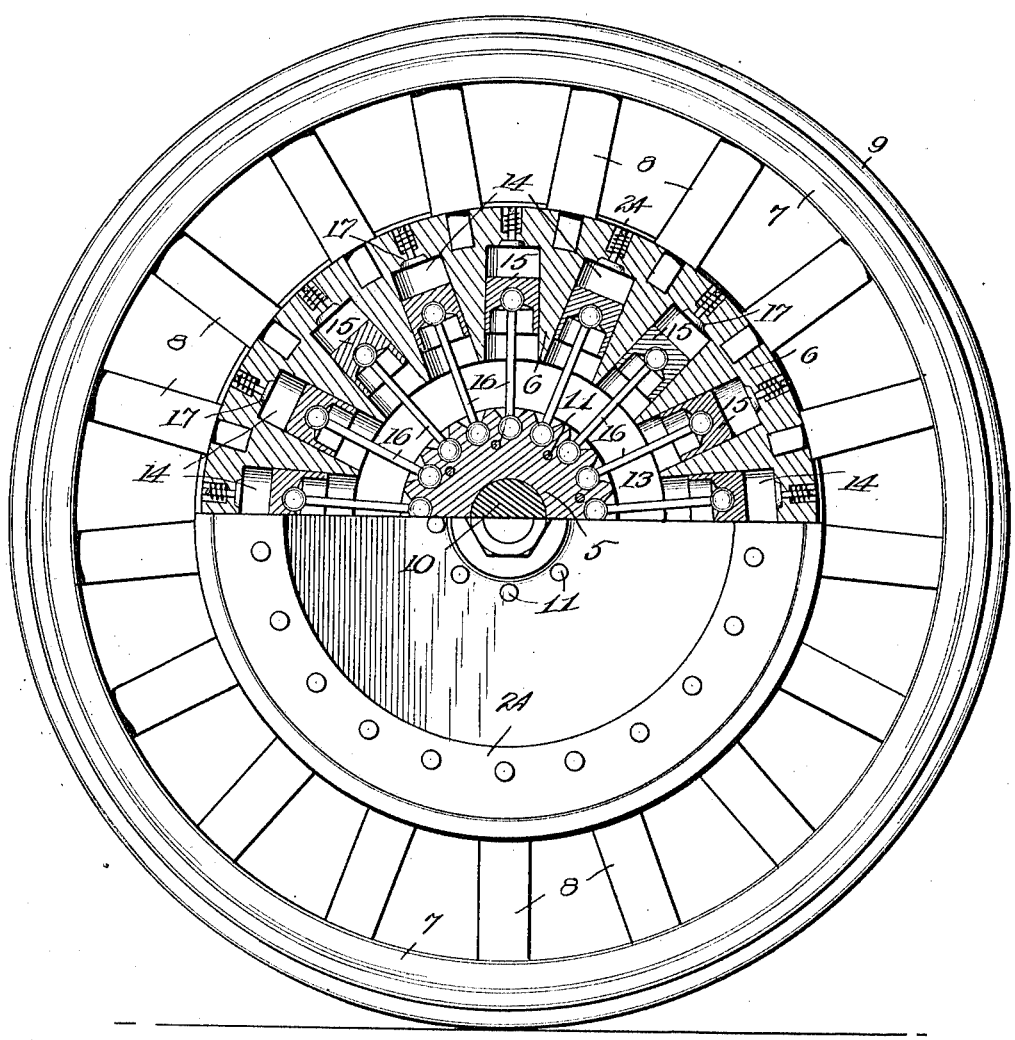

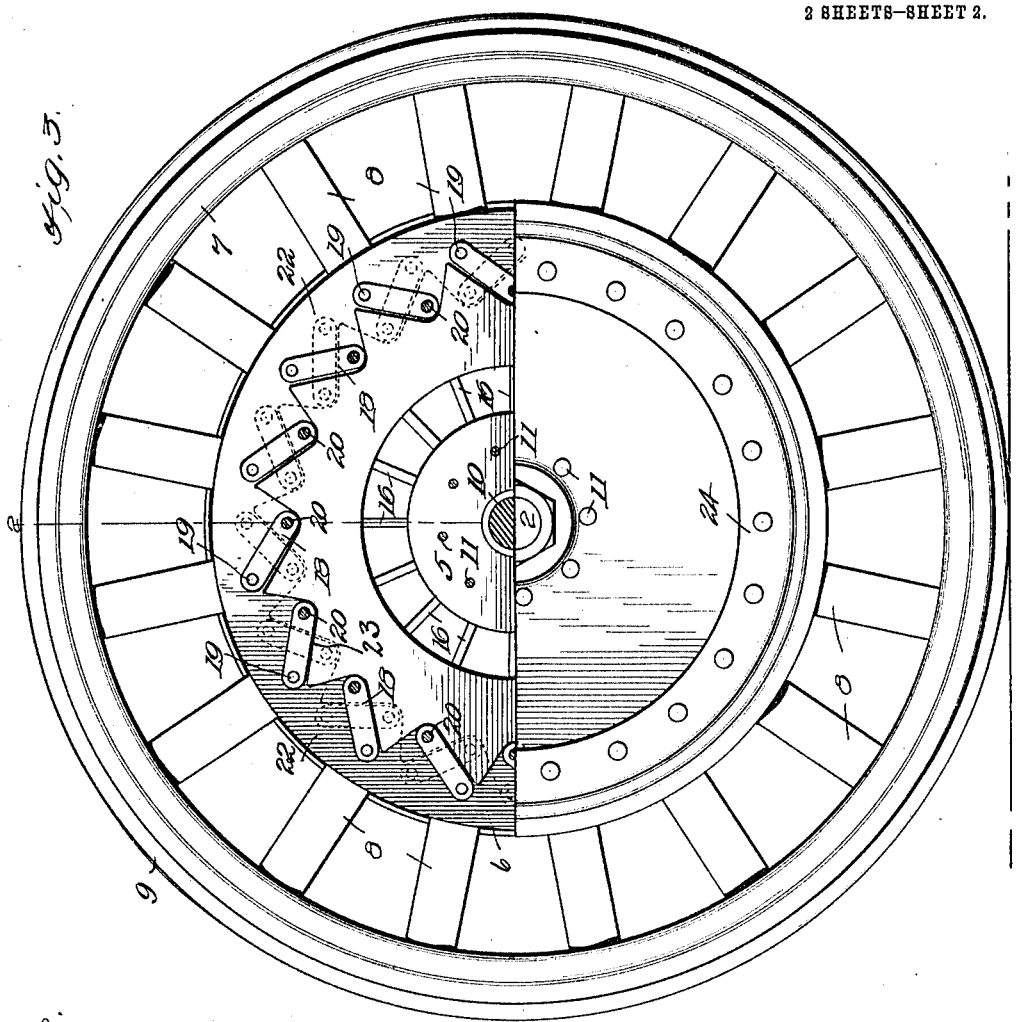

SAMUEL WHITING, OF ATHOL, MASSACHUSETTS.

VEHICLE-WHEEL.

1,001,329.  Specification of Letters Patent.  Patented Aug. 22, 1911.

Application filed December 15, 1910. Serial No. 597,446.

*To all whom it may concern:*

Be it known that I, SAMUEL WHITING, a citizen of the United States, residing at Athol, in the county of Worcester and State of Massachusetts, have invented certain new and useful Improvements in Vehicle-Wheels, of which the following is a specification.

This invention relates to that class of vehicle wheels which are provided with cushioning means comprising an arrangement of radially disposed air cylinders and plungers working therein, said plungers serving to compress the air in the cylinders, and thus produce the cushioning effect.

The wheel which is the subject of the present invention comprises two concentric hub sections between which the cushion is interposed, together with a connection between said hub sections which is independent of the cushion, thus relieving the latter of the driving strain.

The invention also consists in a novel construction and arrangement of parts to be hereinafter described and claimed, reference being had to the accompanying drawings, in which—

Figure 1 is a side elevation of the wheel, partly in section on the line 1—1 of Fig. 2; Fig. 2 is an edge view partly in vertical section on the line 2—2 of Fig. 3; and Fig. 3 is a side elevation of the wheel partly broken away to show the connection between the two hub sections.

In the drawings, 5 and 6 denote, respectively, inner and outer hub sections, said sections being concentric, and spaced apart a suitable distance to permit relative radial movement. The felly 7 is connected to the outer hub section by spokes 8 arranged in the ordinary manner, and the felly may be fitted with a solid rubber or other tire 9. A pneumatic tire is not necessary, it being the object of the invention to produce a wheel having sufficient resiliency to enable such a tire to be dispensed with.

The inner hub section 5 is made fast to the axle 10 in such a manner that it will turn therewith, and to opposite sides of said section are rigidly secured, by means of transverse bolts 11, circular plates 12 and 13, said plates having a greater diameter than that of the inner hub section, so that they may project a sufficient distance therefrom to inclose the outer hub section 6, the latter fitting loosely between said plates, so that it is free to slide in the direction of the inner hub section.

In the outer hub section are formed chambers 14 which are spaced uniformly apart and extend radially in a circular series around the inner hub section 5, said chambers opening through that portion of the outer hub section which is opposite the inner hub section. These chambers form air cylinders, in each one of which operates a plunger 15 which is connected by a rod 16 to the inner hub section. The connections of the rod with the plunger and the inner hub section are made by means of ball-and-socket joints, as shown in Figs. 1 and 2, to permit a free relative movement of the two hub sections. The outer ends of the air cylinders are provided with inwardly opening in-take valves 17, to admit air when the plungers move inwardly, said valves closing when the plungers move in the opposite direction, during which movement the air within the cylinders is compressed.

In order to remove all the driving strain from the cushioning devices herein described, there is provided an additional connection between the hub sections. This connection comprises links 18 which are pivotally connected at one of their ends, by means of pins 19, to the outer hub section, and at their other ends, by means of pins 20, to the plates 12 and 13. One set of links connects the outer hub section to the plate 12, and another set is located at the opposite side of the outer hub section and connects the same to the plate 13. The links of one set extend diagonally in one direction, and the links of the other set extend diagonally in the opposite direction, so that the movement of the inner hub section will be transmitted to the outer hub section, irrespective of the direction in which the axle and the inner hub section are turning.

The inner faces of the plates 12 and 13 are recessed, as shown at 21 in Fig. 2, and the adjacent faces of the outer hub section are correspondingly recessed, as indicated at 22, to receive the links 18. The inner ends of these recesses are formed with pockets, the walls of which are inclined as indicated at 23 in Fig. 3, said walls extending at the same angle as the links 18, and the latter having one of their longitudinal edges located in close proximity thereto. This arrangement serves to assist the transmission of the movement of the inner hub section to the outer hub section in case of lost motion from loose joints, in which event the links would come in contact with the inclined surfaces 23.

In order to protect the link connection from dust and dirt, there is provided a cover comprising rings 24 which are secured to the outer faces of the plates 12 and 13, and have inward bends extending across the outer edges of said plates, and across the joint between the same and the outer hub section.

I claim:

1. A wheel comprising spaced concentric inner and outer hub sections, one of said sections having a series of radial cylinders, plungers working in the cylinders, connections between said plungers and the other hub section, a felly carried by the outer hub section, plates secured to opposite sides of the inner hub section, between which plates the outer hub section is slidably mounted, and diagonal links loosely connecting the aforesaid plates to the outer hub section, the links connecting one of said plates being inclined in the opposite direction to the links connecting the other plate.

2. A wheel comprising spaced concentric inner and outer hub sections, one of said sections having a series of radial cylinders, plungers working in the cylinders, connections between said plungers and the other hub section, a felly carried by the outer hub section, plates secured to opposite sides of the inner hub section, between which plates the outer hub section is slidably mounted, diagonal links connecting the aforesaid plates to the outer hub section, the contiguous faces of said plates and hub sections being recessed, and the inner ends of the recesses being formed with pockets to receive the links, said pockets having an inclined wall, and the aforesaid links having one of their longitudinal edges extending in close proximity to said wall.

In testimony whereof I affix my signature in presence of two witnesses.

SAMUEL WHITING.

Witnesses:
WALLACE O. POWERS,
CLARENCE E. HUNT.

---

Copies of this patent may be obtained for five cents each, by addressing the "Commissioner of Patents, Washington, D. C."